Patented Mar. 15, 1932

1,849,153

UNITED STATES PATENT OFFICE

FRIEDRICH RASPE, OF LEVERKUSEN, NEAR COLOGNE, AND PAUL WEISE, OF WIESDORF-ON-THE-RHINE, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

METHOD FOR PREPARING HIGHLY CONCENTRATED TITANIUM SULPHATE SOLUTIONS

No Drawing. Application filed March 28, 1929, Serial No. 350,800, and in Germany April 4, 1928.

This invention relates to new concentrated titanyl- and titanium sulphate solutions and to a process of preparing same.

In the manufacture of concentrated titanyl- or titanium-sulphate solutions with a little excess of free acid, that means titanyl- or titanium-sulphate solutions containing, calculated on one molecule $TiO_2$, more than one molecule of sulphuric acid or two molecules respectively, there is a difficulty inasmuch as the meta-titanic acid in which form the titanium dioxide generally is obtained, is not soluble but in a large excess of concentrated sulphuric acid, while the ortho-titanic acid is soluble in diluted acids without difficulties, but, when technically prepared, it always contains great quantities of water. It is possible to dehydrate ortho-titanic acid in vacuo, but this reaction must occur very slowly lest a conversion of the ortho-titanic acid into the meta-titanic acid takes place. Therefore, this process has not been applied on a technical scale.

Now a process has been found rendering possible the manufacture of concentrated solutions of titanyl- or titanium sulphate which are free from iron and contain a small excess of free sulphuric acid. First a concentrated solution of meta-titanic acid or titanium dioxide in concentrated sulphuric acid is prepared in the usual manner by dissolving the titanium dioxide or the meta-titanic acid at an elevated temperature, say between about 150 and 200° C. Into this solution is introduced at a temperature not over 60° C. ortho-titanic acid in small portions while stirring, until the solution has the desired content of titanium oxide. During the dissolving process it can be determined by titration with caustic alkalies whether the solution still contains free sulphuric acid, that is to say, whether more than two molecules of sulphuric acid for each molecule of titanium dioxide are present.

Instead of preparing, in the first stage, a concentrated solution of meta-titanic acid in sulphuric acid, the saturation with meta-titanic acid can be effected in the second stage, by dissolving first a certain quantity of meta-titanic acid at a temperature between 150–200° C., then allowing the solution to cool down to at least about 60° C., then saturating successively the solution with meta-titanic acid and ortho-titanic acid; both methods of carrying out our process are equivalents. A strongly diluted solution containing titanium sulphate or titanyl sulphate results which can be evaporated in vacuo, when heated, say to about 70 to 100° C., and no titanium-dioxide falls out. In this manner highly concentrated titanyl- or titanium-sulphate solutions, containing up to 500 grams of titanium-dioxide in one liter or more are obtainable, said solutions being soluble in water and being directly applicable, especially as tanning and mordanting materials.

The following examples illustrate our invention, without limiting it thereto:

*Example 1.*—100 kgs. of meta-titanic acid are dissolved in 150–200 kgs. of concentrated sulphuric acid at a temperature between 150° and 200° C., and into this solution at a temperature of from 40–60° C. at first meta-titanic acid is introduced, until the solution is saturated, then ortho-titanic acid is introduced while stirring until the desired basicity is reached. The strongly diluted solution is evaporated at 70–90° C. eventually while stirring. A syrup easily soluble in water remains containing more than 500 grams of $TiO_2$ in a liter.

*Example 2.*—100 kgs. of titanium dioxide are dissolved in 250 kgs. of concentrated sulphuric acid at about 150° C.; into this solution there are introduced after cooling 54 kgs. of ortho-titanic acid (30%) at 50° C. while stirring until the titanium dioxide is dissolved. The solution thus obtained is concentrated in vacuo at about 80° C.; a syrup easily soluble in water is obtained, containing about 95% of titanyl-sulphate and about 5% of titanium sulphate, calculated on the amount of the titanium present.

By the term "titanium sulphate" in the claims, we mean the titanium sulphate of the formula $Ti(SO_4)_2$ and the basic titanium sulphate of the formula $TiOSO_4$.

We claim:

1. In the process of preparing highly concentrated titanium sulphate solutions, the step which comprises dissolving ortho-titanic acid in a saturated solution of meta-titanic acid in concentrated sulphuric acid at a temperature of not over 60° C.

2. In the process of preparing highly concentrated titanium sulphate solutions, the step which comprises dissolving ortho-titanic acid in an amount that for two molecules of sulphuric acid at least about one molecule of titanium dioxide is present, in a saturated solution of meta-titanic acid in concentrated sulphuric acid, at a temperature of not over 60° C.

3. In the process of preparing highly concentrated titanium sulphate solutions, the step which comprises dissolving ortho-titanic acid in an amount that for two molecules of sulphuric acid about one molecule to about two molecules of titanium dioxide are present, in a saturated solution of meta-titantic acid in concentrated sulphuric acid, at a temperature of not over 60° C.

4. In the process of preparing highly concentrated titanium sulphate solutions, the steps which comprise dissolving ortho-titanic acid in a saturated solution of meta-titanic acid in concentrated sulphuric acid, at a temperature of not over 60° C. and heating the solution in a vacuum to concentrate it.

5. In the process of preparing highly concentrated titanium sulphate solutions, the steps which comprise dissolving ortho-titanic acid in an amount that for two molecules of sulphuric acid at least about one molecule of titanium dioxide is present, in a saturated solution of meta-titanic acid in concentrated sulphuric acid, at a temperature of not over 60° C. and heating the solution in a vacuum to concentrate it.

6. In the process of preparing highly concentrated titanium sulphate solutions, the steps which comprise dissolving ortho-titanic acid in an amount that for two molecules of sulphuric acid about 1 molecule to about two molecules of titanium dioxide are present, in a saturated solution of meta-titanic acid in concentrated sulphuric acid, at a temperature of not over 60° C. and heating the solution in a vacuum to concentrate it.

In testimony whereof we have hereunto set our hands.

FRIEDRICH RASPE. [L. S.]
PAUL WEISE. [L. S.]